(12) United States Patent
Hirose

(10) Patent No.: US 8,462,441 B2
(45) Date of Patent: Jun. 11, 2013

(54) ZOOM LENS

(75) Inventor: Takuma Hirose, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 13/382,849

(22) PCT Filed: Jul. 1, 2010

(86) PCT No.: PCT/JP2010/061235
§ 371 (c)(1),
(2), (4) Date: Jan. 6, 2012

(87) PCT Pub. No.: WO2011/004757
PCT Pub. Date: Jan. 13, 2011

(65) Prior Publication Data
US 2012/0105974 A1  May 3, 2012

(30) Foreign Application Priority Data
Jul. 9, 2009 (JP) ................. 2009-162621

(51) Int. Cl.
*G02B 15/14* (2006.01)
(52) U.S. Cl.
USPC .......................... 359/684; 359/687

(58) Field of Classification Search
USPC .................. 359/676, 684, 686, 687
See application file for complete search history.

(56) References Cited

FOREIGN PATENT DOCUMENTS

| JP | 9-281393 | 10/1997 |
|---|---|---|
| JP | 2008-203415 | 9/2008 |
| JP | 2009-058868 | 3/2009 |
| WO | WO 2006/090660 | 8/2006 |

*Primary Examiner* — Jack Dinh
(74) *Attorney, Agent, or Firm* — Cozen O'Connor

(57) ABSTRACT

Provided is a compact zoom lens with a high resolving power, a large aperture, and a high variable power. The zoom lens includes a positive first lens group, a moving negative second lens group, a stationary positive third lens group, and a moving positive fourth lens group. The first lens group includes a negative eleventh lens, a positive twelfth lens, and a positive thirteenth lens. The second lens group is composed of a negative twenty-first lens, a negative twenty-second lens, a positive twenty-third lens, and a negative twenty-fourth lens. The third lens group includes a positive thirty-first lens, a positive thirty-second lens, and a negative thirty-third lens. The fourth lens group is composed of a positive forty-first lens having one or more aspheric surfaces. The zoom lens satisfies the prescribed conditional expressions.

13 Claims, 6 Drawing Sheets

ZOOM LENS

RELATED APPLICATIONS

This application is a U.S. National Phase Application under 35 USC 371 of International Application PCT/JP2010/061235 filed Jul. 1, 2010.

This application claims the priority of Japanese application No. 2009-162621 filed Jul. 9, 2009, the entire content of which is hereby incorporated by reference.

TECHNICAL FIELD

The present invention relates to a compact zoom lens which is suitable to a digital camera and a video camera, and has a large aperture and high variable power ratio.

BACKGROUND ART

In order to achieve downsizing of a zoom lens, it is required to reduce a thickness of each lens group included in the zoom lens as much as possible. On the other hand, for the purpose of reducing the movement amount of a power-varying lens group, there is a tendency that refractive power of each lens group increases. There have been filed a large number of applications relating to a technology of downsizing a zoom lens, and zoom lenses with high variable power achieving the variable power ratio of ×10 are known (for example, Patent Literature 1).

CITATION LIST

Patent Literature

Patent Literature 1: JP-A No. H09-281393

SUMMARY OF INVENTION

Technical Problem

In the case that a zoom lens is small, a stroke of a movement of a power-varying lens group for varying power on the optical axis becomes short when the power is varied from a wide-angle end to a telephoto end. For maintaining a short movement amount and a proper variable power ratio, refractive power of the power-varying lens group has to be increased. According to that, aberrations caused in the power-varying lens group are enlarged, too. In order to maintaining high resolving power under the situation, it is required to reduce the power assigned to each lens by maintaining respective lens group thin and increasing the number of lenses of the power-varying lens group, to control aberrations generated in the lens group to be small.

However, in a zoom lens such that the second lens group being a power-varying lens group is composed of three lenses of a negative lens, a positive lens and a negative lens, as the conventional zoom lens as described in Patent Literature 1, the power assigned to each of the lenses is large. Therefore, aberrations generated in the lens group are enlarged and high resolving power is hardly maintained in the whole of the region from the wide-angle and to the telephoto end, which has been a problem.

The present invention has been achieved in view of the above problem, and is aimed to provide a zoom lens which realizes high resolving power over all the shooting range, a short total length, a small size, a large aperture and high variable power.

Solution to Problem

The above object will be achieved by the inventions described below.

1. A zoom lens comprising, in order from an object side:
   a first lens group with positive power;
   a second lens group with negative power, moving for varying power of the zoom lens;
   a third lens group with positive power, disposed stationary; and
   a fourth lens group with positive power, moving for correcting a position change of an image plane caused when the power of the zoom lens is varied,
   the zoom lens characterized in that
   the first lens group comprises, in order from the object side, a negative eleventh lens, a positive twelfth lens and a positive thirteenth lens,
   the second lens group consists of in order from the object side, a negative twenty-first lens, a negative twenty-second lens, a positive twenty-third lens and a negative twenty-fourth lens,
   the third lens group comprises, in order from the object side, a positive thirty-first lens, a positive thirty-second lens and a negative thirty-third lens,
   the fourth lens group consists of a positive forty-first lens including one or more aspheric surfaces, and
   the zoom lens satisfies the following conditional expressions.

$$-1.8 < f2/fw < -0.9 \tag{1}$$

$$2.9 < f34/fw < 3.5 \tag{2}$$

$$75.0 < \nu 1 \tag{3}$$

In the expressions, f2 is a focal length of the second lens group,
f34 is a composite focal length of the third lens group and the fourth lens group at a wide-angle end,
fw is a focal length at the wide-angle end, and
ν1 is an Abbe number of at least one positive lens forming the first lens group.

2. The zoom lens of Item 1, characterized in that the thirty-first lens includes at least one aspheric surface.

3. The zoom lens of Item 1 or 2, characterized in that the thirty-second lens and the thirty-third lens form a cemented lens made of glass, and a cemented surface is formed into a convex surface facing an image-plane side.

4. The zoom lens of any one of Items 1 to 3, characterized in that a positive lens or positive lenses forming the third lens group satisfies the following expression.

$$70.0 < \nu 3 \tag{4}$$

In the expression, ν3 is an Abbe number of at least one positive lens forming the third lens group.

5. The zoom lens of any one of Items 1 to 4, characterized in that the third lens group consists of, in order from the object side, a positive thirty-first lens, a positive thirty-second lens and a negative thirty-third lens.

6. The zoom lens of any one of Items 1 to 5, characterized in that the first lens group consists of, in order from the object side, a negative eleventh lens, a positive twelfth lens and a positive thirteenth lens.

7. The zoom lens of any one of Items 1 to 6, characterized in that the twelfth lens satisfies the following expression.

$$75.0 < \nu 1 \tag{3}$$

8. The zoom lens of any one of Items 1 to 7, characterized in that the eleventh lens and the twelfth lens form a cemented lens made of glass.
9. The zoom lens of any one of Items 1 to 8, characterized in that the first lens group satisfies the following expression.

$$4.0<f1/fw<8.5 \quad (5)$$

In the expression, f1 is a focal length of the first lens group.
10. The zoom lens of any one of Items 1 to 9, characterized in that each of one or more negative lenses included in the second lens group is a complex aspheric lens in which an aspheric surface made of resin is formed on a spherical glass surface.
11. The zoom lens of any one of Items 1 to 10, characterized in that the forty-first lens satisfies the following expression.

$$v41>60 \quad (6)$$

In the expression, v41 is an Abbe number of the forty-first lens.
12. The zoom lens of any one of Items 1 to 11, characterized in that a focusing operation is performed from an object at an infinite distance to an object at a close distance by moving the fourth lens group in a direction of an optical axis.
13. The zoom lens of any one of Items 1 to 12, characterized by further comprising a stop arranged at the object side of the third lens group, wherein an opening diameter of the stop changes corresponding to a position of the second lens group on an optical axis.

In the zoom lens of the present invention, there are arranged four lens groups: a first lens group with positive power; a second lens group with negative power, a third lens group with positive power; and a fourth lens group with positive power. When the power is varied from the wide-angle end to the telephoto end, the second lens group is moved toward the image-plane side, and a part or the whole of the fourth lens group is moved with forming a convex locus toward the object side to correct a position change of an image plane caused corresponding to the varying power. This structure works for effective use of the space between the third lens group and the fourth lens group and achieves downsizing of the total lens length effectively.

The first lens group includes, in order from the object side, a negative eleventh lens, a positive twelfth lens and a positive thirteenth lens. By employing such the structure, a longitudinal chromatic aberration generated in the first lens group can be reduced to be small at the telephoto end where the diameter of the incident light flux becomes large.

In Examples of the zoom lenses of the present invention, the eleventh lens and the twelfth lens form a cemented lens made of glass. Forming the cemented lens makes an assembling process relatively easy in comparison with the case that each of the lenses is provided as a single lens.

The second lens group is composed of four lenses which are, in order from the object side, a negative twenty-first lens, a negative twenty-second lens, a positive twenty-third lens and a negative twenty-fourth lens. By providing such the structure, the power assigned to each of the lenses is reduced and a fluctuation of aberration caused in a zooming operation can be controlled to be small.

Further, the second lens group includes at least one aspheric surface to correct various aberrations. The aspheric surface of the second lens group mainly corrects off-axis aberrations coming from refraction of an off-axis principal ray, especially distortion. Further, when a complex structure is formed with a glass spherical lens and a resin in an aspheric-surface shape as shown in the following Examples 1 to 3, this structure allows a wide choice in the kinds of lens material in comparison with a molded glass lens and a plastic lens and enlarges the effect of correcting various aberrations.

When the third lens group consists of, in order from the object side, a positive thirty-first lens, a positive thirty-second lens and a negative thirty-third lens, the structure allows correcting spherical aberration and coma in excellent conditions. Further, since a height of a ray in the negative lens becomes low, Petzval sum becomes small and field curvature can be reduced. By providing two positive lenses, positive power of each lens can be reduced and spherical aberration and coma generated in each positive lens can be reduced.

When the third lens group includes at least one aspheric surface, fluctuations of spherical aberration and coma can be connected in excellent conditions.

In Examples of zoom lenses of the present invention, the thirty-second lens and the thirty-third lens form a cemented lens made of lens. Forming the cemented lens makes an assembling process relatively easy in comparison with the case that each of the lenses is provided as a single lens.

The cemented surface of the thirty-second lens and the thirty-third lens which form a cemented glass lens, is formed into a convex surface facing the image-plane side. This structure allows correcting chromatic aberrations in an excellent condition. This structure further allows maintaining a small outgoing angle of light emitted from the cemented surface, and correcting various aberrations in excellent conditions.

The fourth lens group is composed of one positive lens. The single lens structure makes the thickness of the fourth lens group thin and provides a structure that the fourth lens group moving at a power-varying operation and at a focusing operation does not interfere mechanically with the third lens group and an optical element arranged at the image-plane side, such as a low-pass filter.

The fourth lens group includes at least one aspheric surface. The fourth lens group contributes to spherical aberration and coma over the whole variable power region, and the use of an aspheric surface therein is significantly effective.

In Examples of zoom lenses of the present invention, each of the first lens group and the third lens group increases a cemented lens. Employing the cemented lenses makes an assembling process relatively easy in comparison with the case that each of the lenses is provided as a single lens.

When shooting is performed with the zoom lens in each embodiment from an object at an infinite distance to an object at a close distance, the fourth lens group moves toward the object side to perform a focusing operation. In comparison with a zoom lens in which the first lens group moves for performing a focusing operation, the structure allows an effective aperture of the first lens group to be smaller, and the entire of the lens system is easily downsized.

In the zoom lenses of the present embodiments, the opening aperture is varied by using the position on the optical axis of the second lens group as a power-varying group. The reason is that both of cutting a harmful light flux to form a flare light component and reducing unevenness of illuminance on the image plane are achieved, and that aberrations are easily corrected especially at the telephoto end and a margin for design is provided.

Next, the conditional expressions (1) to (6) will be described.

The conditional expression (1) provides refractive power of the second lens group. When the value exceeds the upper limit of the conditional expression (1), Petzval sum becomes large in the negative direction to be an over-corrected condition. When the value becomes below the lower limit of the conditional expression (1), the movement amount of the second lens group which contributes to the varying power becomes large, which enlarges the total length and the diameter of the forefront lens and makes downsizing of the lens unit difficult.

The conditional expression (2) is an expression for properly setting refractive power of the third lens group and the succeeding lens groups. When the value exceeds the upper limit of the conditional expression (2), power of lens groups at the rear of the stop becomes weak, which enlarges the size of the zoom lens. When a value becomes below the lower limit of the conditional expression (2), it is advantageous to achieve compactness but a necessary back focal length is hardly secured.

The conditional expression (3) provides the Abbe number of a positive lens or positive lenses forming the first lens group. When the first lens group which has positive power in total, includes a negative lens, and a positive lens or positive lenses formed of a material satisfying the conditional expression (3), secondary spectrum can be eliminated and longitudinal chromatic aberration generated especially around the telephoto end can be reduced. When the Abbe number becomes small to be below the lower limit of the conditional expression (3), correction of the longitudinal chromatic aberration generated around the telephoto end is insufficient.

The conditional expression (4) provides the Abbe number of a positive lens or positive lenses forming the third lens group. When the third lens group which has positive power in total, includes a negative lens, and a positive lens or positive lenses formed of a material satisfying the conditional expression (4), secondary spectrum can be eliminated and longitudinal chromatic aberration generated especially around the wide-angle end can be reduced. When the Abbe number becomes small to be below the lower limit of the conditional expression (4), correction of the longitudinal chromatic aberration and magnification chromatic aberration generated around the telephoto end is insufficient.

The conditional expression (5) provides a focal length of the first lens group. When the value exceeds the upper limit of the conditional expression (5), the movement amount of the second lens group for varying power becomes great and the total length of the zoom lens is increased. When the value becomes below the lower limit of the conditional expression (5), spherical aberration and longitudinal chromatic aberration at the telephoto end which is mainly corrected by the first lens group start to be deteriorated.

The conditional expression (6) provides the Abbe number of the positive lens of the fourth lens group. When the fourth lens group consists of one positive lens, a material with a large Abbe number is used for the positive lens in the fourth lens group to reduce chromatic aberrations generated in the fourth lens group. When the Abbe number becomes out of the conditional expression (6), magnification chromatic aberration becomes easily large in the direction that the image height becomes smaller for the g-line in comparison with the d-line and longitudinal chromatic aberration becomes easily large in the direction that the g-line is under-corrected in comparison with the d-line.

Advantageous Effects of Invention

According to the present invention, there can be achieved a zoom lens which realizes high resolving power over all the shooting range, a short total length, a small size, a large aperture and high variable power.

EXAMPLES

Figure 1:
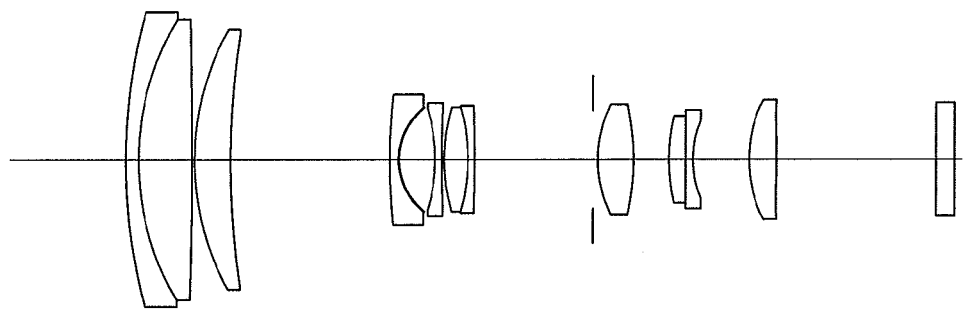
FIG. 1 shows a lens structure diagram at the intermediate focal length of Example 1.

Examples relating to a zoom lens of the present invention will be described below.
The reference signs are defined as follows.
f: focal length of the total system
F: F number
$\omega$: half angle of view
R: curvature radius
d: lens thickness or lens distance
$n_d$: refractive index at d-line
$v_d$: Abbe number
*: aspheric surface A shape of an aspheric surface is represented by the following Math. 1, where the vertex of the surface is defined as the origin, the X-axis extends in the optical axis direction and h represents a height in the direction perpendicular to the optical axis.

$$X = \frac{h^2/R}{1+\sqrt{1-(1+K)h^2/R^2}} + \sum A_i h^i \qquad \text{[Math. 1]}$$

In the expression, $A_i$ is i-th-order aspheric surface coefficient, and K is a conic constant. In the lens structure diagram of each example, a member arranged at the rear of the endmost lens surface is a cover glass.

Example 1

Surface data is listed below.

|      | R        | d        | $n_d$  | $v_d$ |
|------|----------|----------|--------|-------|
| 1    | 48.624   | 1.10     | 1.846  | 23.8  |
| 2    | 24.033   | 4.60     | 1.497  | 81.6  |
| 3    | −532.076 | 0.20     |        |       |
| 4    | 23.285   | 3.10     | 1.835  | 42.7  |
| 5    | 72.709   | Variable |        |       |
| 6    | 50.458   | 0.80     | 1.883  | 40.8  |
| 7    | 5.841    | 0.05     | 1.513  | 53.8  |
| 8(*) | 5.503    | 3.09     |        |       |
| 9    | −15.246  | 0.60     | 1.835  | 42.7  |
| 10   | 92.983   | 0.20     |        |       |
| 11   | 15.745   | 2.05     | 1.805  | 25.4  |
| 12   | −15.745  | 0.60     | 1.729  | 54.7  |
| 13   | −135.773 | Variable |        |       |
| 14(*)| 10.341   | 3.09     | 1.583  | 59.5  |
| 15(*)| −19.776  | 3.02     |        |       |
| 16   | 16.366   | 1.46     | 1.497  | 81.6  |
| 17   | −737.277 | 0.60     | 1.846  | 23.8  |
| 18   | 8.924    | Variable |        |       |
| 19(*)| 12.578   | 2.36     | 1.516  | 64.2  |
| 20(*)| −61.875  | Variable |        |       |
| 21   | ∞        | 1.60     | 1.516  | 64.2  |
| 22   | ∞        |          |        |       |

The stop is arranged 0.4 mm ahead the fourteenth surface.

Aspheric data is listed below.

Eighth Surface $\kappa=\mathbf{0.000E+00}$, $A4=-1.4998E-04$, $A6=-1.3336E-05$, $A8=3.3487E-07$, $A10=-1.7894E-08$ Fourteenth Surface $\kappa=0.000E+00$, $A4=-1.4910E-04$, $A6=1.6548E-06$, $A8=-2.1605E-08$ Fifteenth Surface $\kappa=0.000E+00$, $A4=8.2952E-05$, $A6=2.7104E-06$, $A8=-4.4326E-08$ Nineteenth Surface $\kappa=0.0000E+00$, $A4=8.5816E-05$, $A6=5.9896E-06$, $A8=-5.6888E-08$ Twentieth Surface $\kappa=0.0000E+00$, $A4=1.6456E-04$, $A6=8.2568E-06$, $A8=-9.7844E-08$ Various data for power varying operation is listed below.

Zooming ratio 9.5

|               | Wide-angle | Intermediate | Telephoto |
|---------------|------------|--------------|-----------|
| Focal length  | 6.9        | 21.2         | 65.6      |
| F number      | 2.88       | 3.93         | 4.6       |
| Angle of view | 29.4       | 10.1         | 3.2       |
| Image height  | 3.815      | 3.815        | 3.815     |
| Total length  | 72         | 72           | 72        |
| BF            | 0.594      | 0.600        | 0.613     |
| d5            | 0.6        | 13.67        | 21.69     |
| d13           | 23.69      | 10.62        | 2.6       |
| d18           | 10.67      | 4.81         | 9.95      |
| d20           | 7.91       | 13.77        | 8.63      |

Zoom lens group data is listed below.

| Group | Forefront surface | Focal length |
|-------|-------------------|--------------|
| 1     | 1                 | 35.02        |
| 2     | 6                 | −7.52        |
| 3     | 14                | 18.64        |
| 4     | 19                | 20.47        |

Values corresponding to the above conditional expressions are listed below.

| Conditional expression (1) | −1.09 |
| Conditional expression (2) | 2.91  |
| Conditional expression (3) | 81.6  |
| Conditional expression (4) | 81.6  |
| Conditional expression (5) | 5.08  |
| Conditional expression (6) | 64.1  |

The zoom lens of the present example is composed of in order from the object side, the first lens group which is composed of a cemented lens of a negative meniscus lens including a convex surface facing the object side and a biconvex lens, and a positive meniscus lens including a convex surface facing the object side; the second lens group which is composed of a negative meniscus lens formed of a hybrid lens wherein a convex surface faces the object side and an aspheric surface is formed of resin on a concave surface facing the image side, a biconcave lens, and a cemented lens of a biconvex lens and a negative meniscus lens including a concave surface facing the object side; the third lens group which is composed of a biconvex lens being a molded glass lens including opposing aspheric surfaces, and a cemented lens of a biconvex lens and a biconcave lens; and the fourth lens group composed of a biconvex lens being a molded glass lens including opposing aspheric surfaces.

Figure 2:
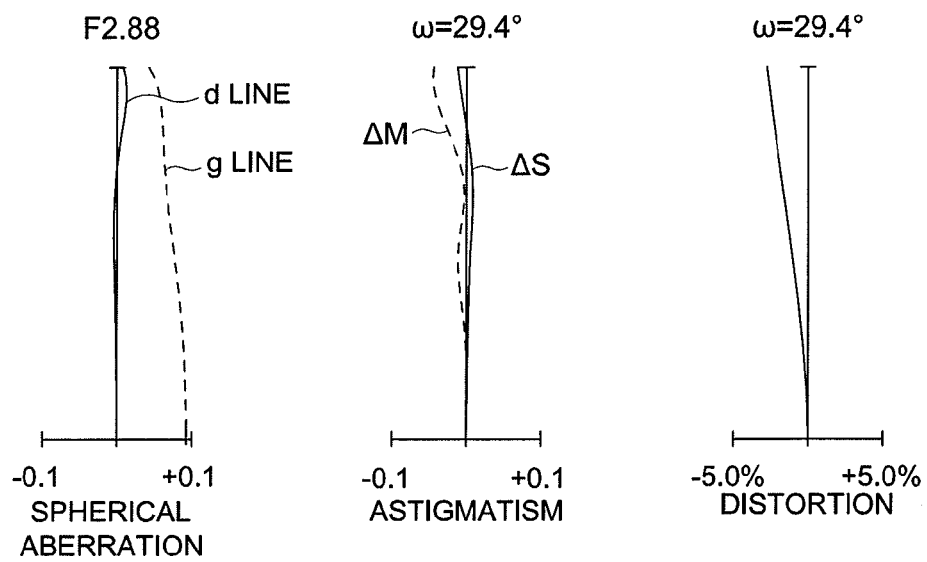
FIG. 2 shows aberration diagrams at the wide-angle end of Example 1.
Figure 3:
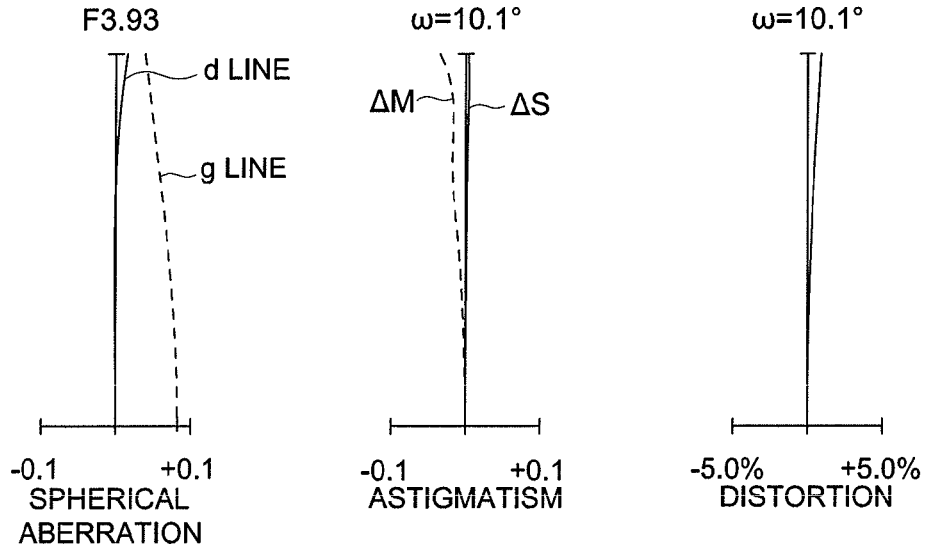
FIG. 3 shows aberration diagrams at the intermediate focal length of Example 1.
Figure 4:
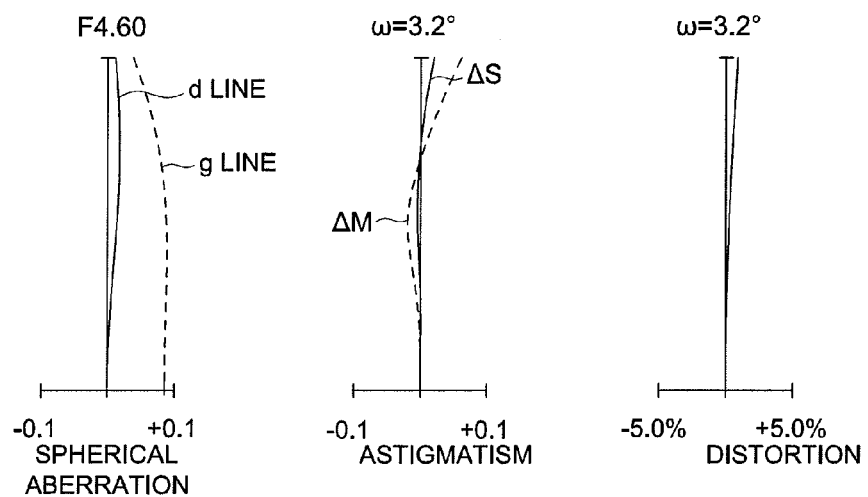
FIG. 4 shows aberration diagrams at the telephoto end of Example 1.

FIG. 1 shows a lens structure diagram at the intermediate focal length. FIG. 2 shows aberration diagrams at the wide-angle end. FIG. 3 shows aberration diagrams at the intermediate focal length. FIG. 4 shows aberration diagrams at the telephoto end.

Example 2

Surface data is listed below.

|      | R        | d        | $n_d$ | $v_d$ |
|------|----------|----------|-------|-------|
| 1    | 70.213   | 1.10     | 1.846 | 23.8  |
| 2    | 31.474   | 4.24     | 1.497 | 81.6  |
| 3    | −103.743 | 0.20     |       |       |
| 4    | 24.372   | 2.70     | 1.835 | 42.7  |
| 5    | 53.725   | Variable |       |       |
| 6    | 99.413   | 0.80     | 1.883 | 40.8  |
| 7    | 6.487    | 0.05     | 1.513 | 53.8  |
| 8(*) | 6.297    | 2.87     |       |       |
| 9    | −16.684  | 0.60     | 1.834 | 37.2  |
| 10   | 30.230   | 0.20     |       |       |
| 11   | 15.423   | 2.64     | 1.805 | 25.4  |
| 12   | −15.423  | 0.60     | 1.729 | 54.7  |
| 13   | −37.367  | Variable |       |       |
| 14(*)| 13.063   | 2.80     | 1.583 | 59.5  |
| 15(*)| −19.067  | 3.00     |       |       |
| 16   | 42.064   | 1.43     | 1.497 | 81.6  |
| 17   | −60.498  | 0.60     | 1.846 | 23.8  |
| 18   | 15.432   | Variable |       |       |

-continued

| | R | d | $n_d$ | $v_d$ |
|---|---|---|---|---|
| 19(*) | 23.348 | 2.14 | 1.487 | 70.4 |
| 20(*) | −23.348 | Variable | | |
| 21 | ∞ | 1.60 | 1.516 | 64.2 |
| 22 | ∞ | | | |

The stop is arranged 0.4 mm ahead the fourteenth surface.
Aspheric data is listed below.
Eighth Surface
κ=0.0000E+00, A4=−3.3913E−05, A6=−1.4062E−05, A8=1.5279E−06, A10=−8.4933E−08, A12=1.6893E−09
Fourteenth Surface
κ=0.0000E+00, A4=−1.4674E−04, A6=4.3937E−07, A8=−1.6475E−07, A10=−7.3812E−10
Fifteenth Surface
κ−0.0000E+00, A4=−2.4026E−06, A6=1.3242E−06, A8=−2.4342E−07, A10=1.6029E−09
Nineteenth Surface
κ=0.0000E+00, A4=−1.7041E−05, A6=2.7531E−06, A8=−1.7554E−07, A10=−9.7651E−10
Twentieth Surface
κ=0.0000E+00, A4=5.1621E−05, A6=4.1212E−06, A8=−2.3017E−07, A10=1.9175E−10

Various data for varying power operation is listed below.
Zooming ratio 9.88

| | Wide-angle | Intermediate | Telephoto |
|---|---|---|---|
| Focal length | 6.9 | 21.2 | 68.2 |
| F number | 2.88 | 3.93 | 4.6 |
| Angle of view | 30.1 | 10.1 | 3.1 |
| Image height | 3.815 | 3.815 | 3.815 |
| Total length | 78.4 | 78.4 | 78.4 |
| BF | 0.595 | 0.594 | 0.603 |
| d5 | 0.6 | 15.72 | 25.52 |
| d13 | 27.52 | 12.4 | 2.6 |
| d18 | 10.94 | 4.89 | 9.33 |
| d20 | 11.17 | 17.22 | 12.78 |

Zoom lens group data is listed below.

| Group | Forefront surface | Focal length |
|---|---|---|
| 1 | 1 | 39.7 |
| 2 | 6 | −8.55 |
| 3 | 14 | 22.43 |
| 4 | 19 | 24.31 |

Values corresponding to the above conditional expressions are listed below.

| | |
|---|---|
| Conditional expression (1) | −1.24 |
| Conditional expression (2) | 3.03 |
| Conditional expression (3) | 81.6 |
| Conditional expression (4) | 81.6 |
| Conditional expression (5) | 5.75 |
| Conditional expression (6) | 70.4 |

The zoom lens of the present example is composed of, in order from the object side, the first lens group which is composed of a cemented lens of a negative meniscus lens including a convex surface facing the object side and a biconvex lens, and a positive meniscus lens including a convex surface facing the object side; the second lens group which is composed of a negative meniscus lens formed of a hybrid lens wherein a convex surface faces the object side and an aspheric surface is formed of resin on a concave surface facing the image side, a biconcave lens, and a cemented lens of a biconvex lens and a negative meniscus lens including a concave surface facing the object side; the third lens group which is composed of a biconvex lens being a molded glass lens including opposing aspheric surfaces, and a cemented lens of a biconvex lens and a biconcave lens; and the fourth lens group composed of a biconvex lens being a molded glass lens including opposing aspheric surfaces.

Figure 5:
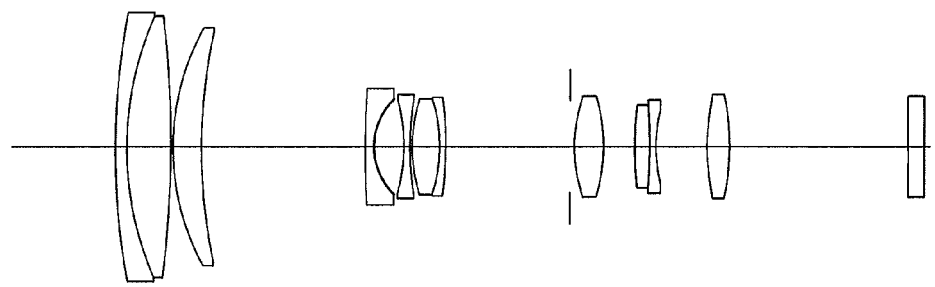
FIG. 5 shows a lens structure diagram at the intermediate focal length of Example 2.
Figure 6:
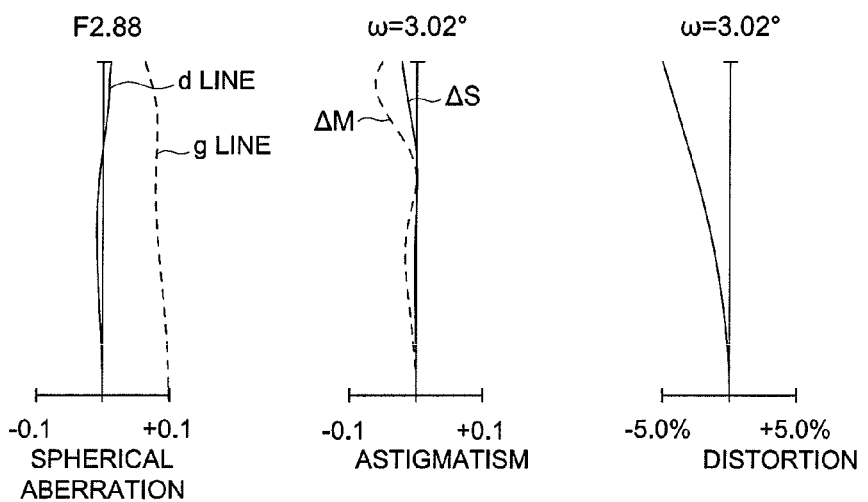
FIG. 6 shows aberration diagrams at the wide-angle end of Example 2.
Figure 7:
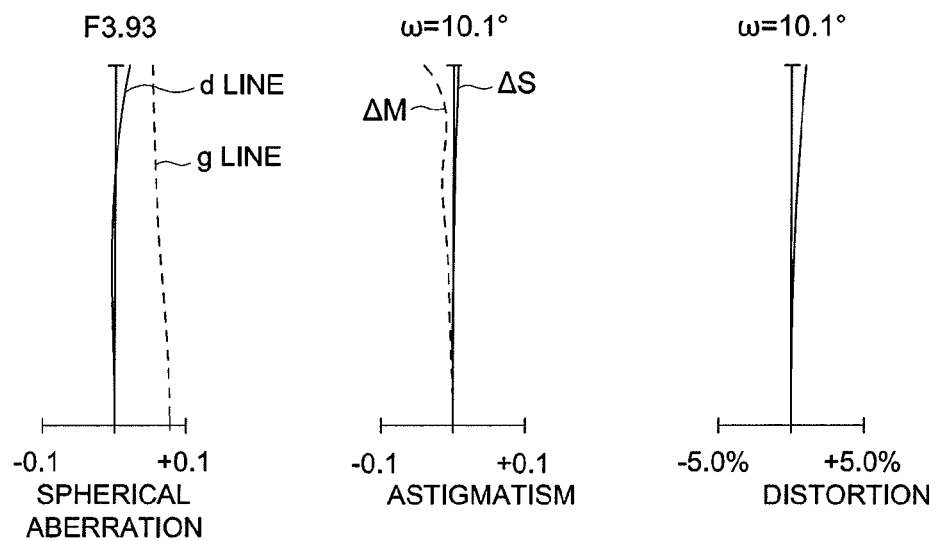
FIG. 7 shows aberration diagrams at the intermediate focal length of Example 2.
Figure 8:
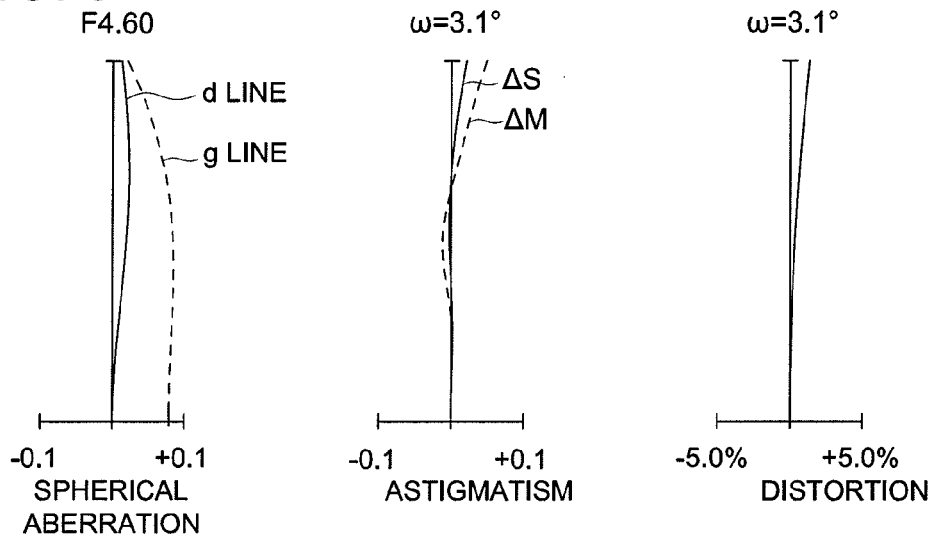
FIG. 8 shows aberration diagrams at the telephoto end of Example 2.

FIG. 5 shows a lens structure diagram at the intermediate focal length. FIG. 6 shows aberration diagrams at the wide-angle end. FIG. 7 shows aberration diagrams at the intermediate focal length. FIG. 8 shows aberration diagrams at the telephoto end.

Example 3

Surface data is listed below.

| | R | d | $n_d$ | $v_d$ |
|---|---|---|---|---|
| 1 | 40.035 | 1.00 | 1.846 | 23.8 |
| 2 | 24.669 | 4.00 | 1.497 | 81.6 |
| 3 | −200.000 | 0.20 | | |
| 4 | 21.641 | 2.60 | 1.729 | 54.7 |
| 5 | 52.563 | Variable | | |
| 6 | 36.821 | 0.80 | 1.883 | 40.8 |
| 7 | 5.340 | 0.05 | 1.513 | 53.8 |
| 8(*) | 5.350 | 2.80 | | |
| 9 | −12.574 | 0.50 | 1.834 | 37.2 |
| 10 | 30.412 | 0.20 | | |
| 11 | 14.274 | 2.05 | 1.846 | 23.8 |
| 12 | −14.274 | 0.50 | 1.804 | 46.6 |
| 13 | −50.749 | Variable | | |
| 14(*) | 8.398 | 2.58 | 1.808 | 40.5 |
| 15(*) | −41.553 | 0.90 | | |
| 16 | 14.697 | 1.80 | 1.487 | 70.4 |
| 17 | −14.697 | 0.60 | 1.846 | 23.8 |
| 18 | 6.399 | Variable | | |
| 19(*) | 8.421 | 2.48 | 1.516 | 64.2 |
| 20(*) | −14.951 | Variable | | |
| 21 | ∞ | 1.60 | 1.516 | 64.2 |
| 22 | ∞ | | | |

The stop is arranged 0.4 mm ahead the fourteenth surface.
Aspheric data is listed below.
Eighth Surface
κ=−2.0000E−01, A4=1.5532E−04, A6=−9.0327E−06, A8=3.2571E−06, A10=−2.5384E−07, A12=8.3315E−09
Fourteenth Surface
κ=−1.9060E+00, A4=2.8326E−04, A6=1.0716E−06, A8=−9.6954E−09, A10=1.7657E−09
Fifteenth Surface
κ=0.0000E+00, A4=−9.2934E−05, A6=1.8432E−06, A8=−6.8695E−09, A10=1.9020E−10
Nineteenth Surface
κ=−8.4000E−01, A4=2.7025E−05, A6=5.8929E−07, A8=1.0195E−07, A10=2.7544E−09
Twentieth Surface
κ=0.0000E+00, A4=2.0358E−04, A6=2.0873E−06, A8=−6.8227E−08, A10=9.8513E−09

Various data for varying power operation is listed below.
Zooming ratio 14.25

|  | Wide-angle | Intermediate | Telephoto |
|---|---|---|---|
| Focal length | 4.02 | 15.17 | 57.3 |
| F number | 1.88 | 2.73 | 3.2 |
| Angle of view | 27.1 | 8.25 | 2.14 |
| Image height | 1.975 | 2.25 | 2.25 |
| Total length | 62 | 62 | 62 |
| BF | 0.600 | 0.607 | 0.628 |
| d5 | 0.6 | 14.48 | 22.22 |
| d13 | 24.22 | 10.34 | 2.6 |
| d18 | 5.80 | 3.20 | 7.57 |
| d20 | 6.10 | 8.70 | 4.33 |

Zoom lens group data is listed below.

| Group | Forefront surface | Focal length |
|---|---|---|
| 1 | 1 | 33.8 |
| 2 | 6 | -6.7 |
| 3 | 14 | 19.74 |
| 4 | 19 | 10.82 |

Values corresponding to the above conditional expressions are listed below.

| Conditional expression (1) | -1.67 |
|---|---|
| Conditional expression (2) | 3.47 |
| Conditional expression (3) | 81.6 |
| Conditional expression (4) | 70.4 |
| Conditional expression (5) | 8.41 |
| Conditional expression (6) | 64.2 |

The zoom lens of the present example is composed of, in order from the object side, the first lens group which is composed of a cemented lens of a negative meniscus lens including a convex surface facing the object side and a biconvex lens, and a positive meniscus lens including a convex surface facing the object side; the second lens group which is composed of a negative meniscus lens formed of a hybrid lens wherein a convex surface faces the object side and an aspheric surface is formed of resin on a concave surface facing the image side, a biconcave lens, and a cemented lens of a biconvex lens and a negative meniscus lens including a concave surface facing the object side; the third lens group which is composed of a biconvex lens being a molded glass lens including opposing aspheric surfaces, and a cemented lens of a biconvex lens and a biconcave lens; and the fourth lens group composed of a biconvex lens being a molded glass lens including opposing aspheric surfaces.

Figure 9:
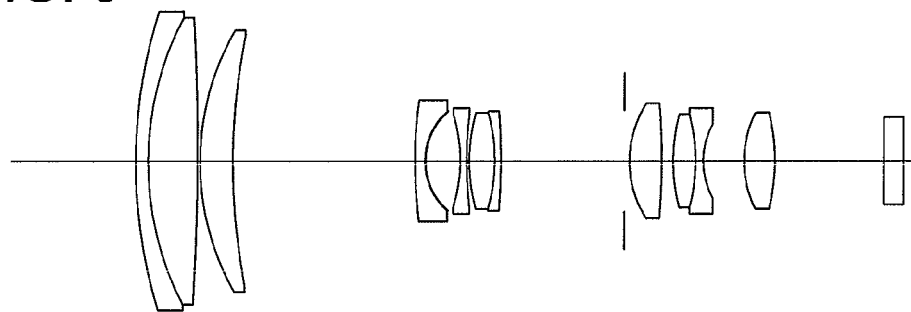
FIG. 9 shows a lens structure diagram at the intermediate focal length of Example 3.
Figure 10:
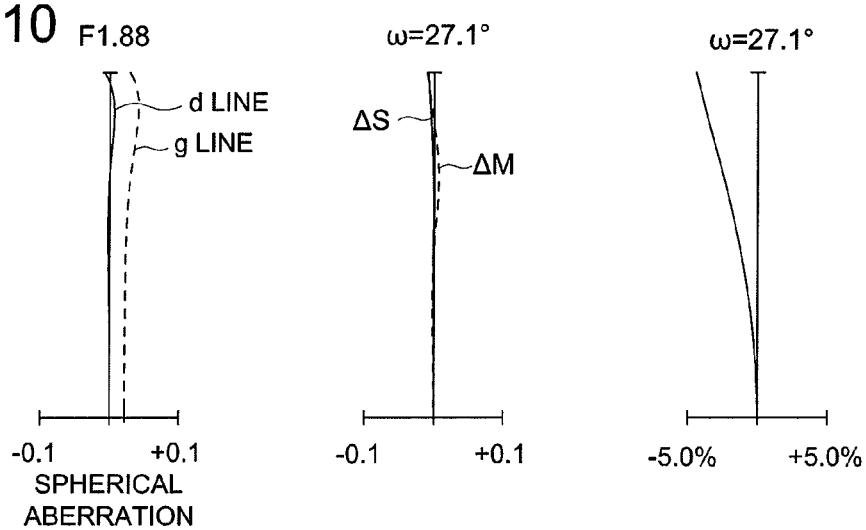
FIG. 10 shows aberration diagrams at the wide-angle end of Example 3.
Figure 11:
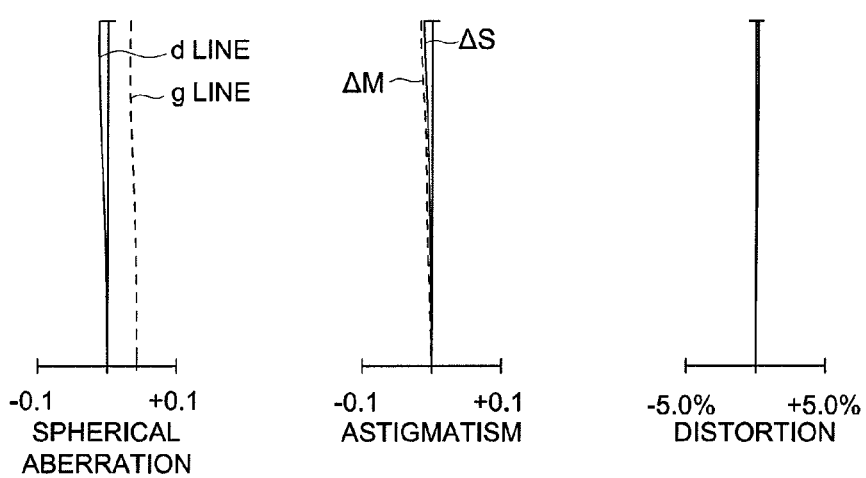
FIG. 11 shows aberration diagrams at the intermediate focal length of Example 3.
Figure 12:
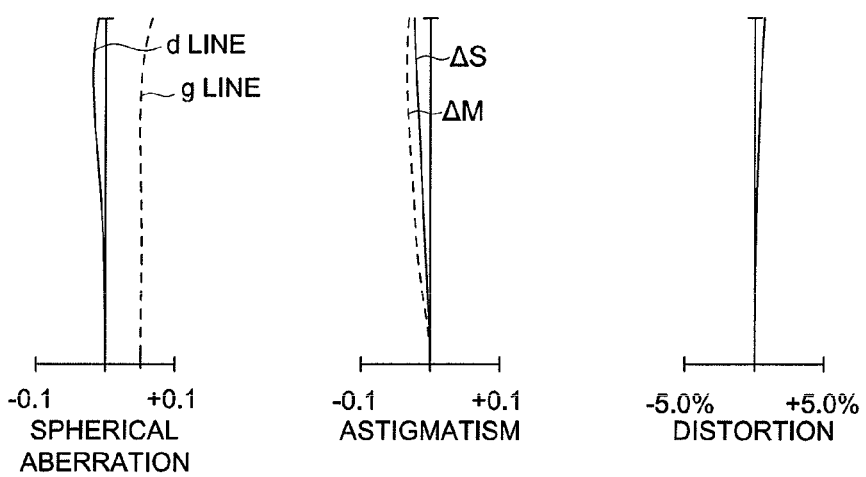
FIG. 12 shows aberration diagrams at the telephoto end of Example 3.

FIG. 9 shows a lens structure diagram at the intermediate focal length. FIG. 10 shows aberration diagrams at the wide-angle end. FIG. 11 shows aberration diagrams at the intermediate focal length. FIG. 12 shows aberration diagrams at the telephoto end.

Example 4

Surface data is listed below.

|  | R | d | $n_d$ | $\nu_d$ |
|---|---|---|---|---|
| 1 | 1250.000 | 1.00 | 1.640 | 34.6 |
| 2 | 26.908 | 4.00 | 1.497 | 81.6 |
| 3 | -239.179 | 0.20 |  |  |
| 4 | 38.005 | 3.00 | 1.497 | 81.6 |
| 5 | -1116.093 | 0.20 |  |  |
| 6 | 23.821 | 3.22 | 1.713 | 53.8 |
| 7 | 59.732 | Variable |  |  |
| 8 | 36.218 | 0.80 | 1.883 | 40.8 |
| 9(*) | 5.353 | 2.80 |  |  |
| 10 | -12.209 | 0.50 | 1.834 | 37.2 |
| 11 | 28.608 | 0.20 |  |  |
| 12 | 14.515 | 2.05 | 1.846 | 23.8 |
| 13 | -14.515 | 0.50 | 1.804 | 46.6 |
| 14 | -37.821 | Variable |  |  |
| 15(*) | 8.324 | 2.58 | 1.808 | 40.5 |
| 16(*) | -44.062 | 0.90 |  |  |
| 17 | 14.259 | 1.80 | 1.487 | 70.4 |
| 18 | -14.259 | 0.60 | 1.846 | 23.8 |
| 19 | 6.404 | Variable |  |  |
| 20(*) | 8.726 | 2.48 | 1.516 | 64.2 |
| 21(*) | -14.696 | Variable |  |  |
| 22 | ∞ | 1.60 | 1.516 | 64.2 |
| 23 | ∞ |  |  |  |
| 24 |  |  |  |  |

The stop is arranged 0.4 mm ahead the fifteenth surface.
Aspheric data is listed below.
Ninth Surface
$\kappa$=0.0000E+00, A4=-9.6480E-06, A6=-7.8391E-06, A8=1.5796E-06, A10=-1.2715E-07, A12=3.9366E-09
Fifteenth Surface
$\kappa$=0.0000E+00, A4=-1.1082E-04, A6=-2.5647E-07, A8=4.2456E-08, A10=6.0586E-10
Sixteenth Surface
$\kappa$=0.0000E+00, A4=9.9311E-05, A6=2.0243E-07, A8=1.4037E-07, A10=2.9889E-09
Twentieth Surface
$\kappa$=0.0000E+00, A4=-1.9903E-04, A6=-3.8399E-06, A8=1.2502E-07, A10=-1.6937E-08
Twenty-First Surface
$\kappa$=0.0000E+00, A4=1.3412E-04, A6=-1.4417E-06, A8=3.4184E-09, A10=-12106E-08

Various data for varying power operation is listed below.
Zooming ratio 14.25

|  | Wide-angle | Intermediate | Telephoto |
|---|---|---|---|
| Focal length | 4.02 | 15.17 | 57.3 |
| F number | 1.88 | 2.73 | 3.2 |
| Angle of view | 27.2 | 8.42 | 2.14 |
| Image height | 1.975 | 2.25 | 2.22 |
| Total length | 65.33 | 65.33 | 65.33 |
| BF | 0.600 | 0.607 | 0.629 |
| d5 | 0.6 | 14.57815 | 22.42523 |
| d13 | 24.025243 | 10.046989 | 2.6 |
| d18 | 5.22 | 2.70 | 7.374175 |
| d20 | 6.07 | 8.58 | 3.912384 |

Zoom lens group data is listed below.

| Group | Forefront surface | Focal length |
|---|---|---|
| 1 | 1 | 33.648 |
| 2 | 6 | -6.877 |
| 3 | 14 | 19.532 |
| 4 | 19 | 11.000 |

Values corresponding to the above conditional expressions are listed below.

| | |
|---|---|
| Conditional expression (1) | −1.71 |
| Conditional expression (2) | 3.35 |
| Conditional expression (3) | 81.6 |
| Conditional expression (4) | 70.4 |
| Conditional expression (5) | 8.37 |
| Conditional expression (6) | 64.2 |

The zoom lens of the present example is composed of, in order from the object side, the first lens group which is composed of a cemented lens of a negative meniscus lens including a convex surface facing the object side and a biconvex lens, a biconvex lens and a positive meniscus lens including a convex surface facing the object side; the second lens group which is composed of a negative meniscus lens being a molded glass lens including a convex surface facing the object side and a concave surface in an aspheric shape facing the image side, a biconcave lens, and a cemented lens of a biconvex lens and a negative meniscus lens including a concave surface facing the object side; the third lens group which is composed of a biconvex lens being a molded glass lens including opposing aspheric surfaces, and a cemented lens of a biconvex lens and a biconcave lens; and the fourth lens group composed of a biconvex lens being a molded glass lens including opposing aspheric surfaces.

Figure 13:
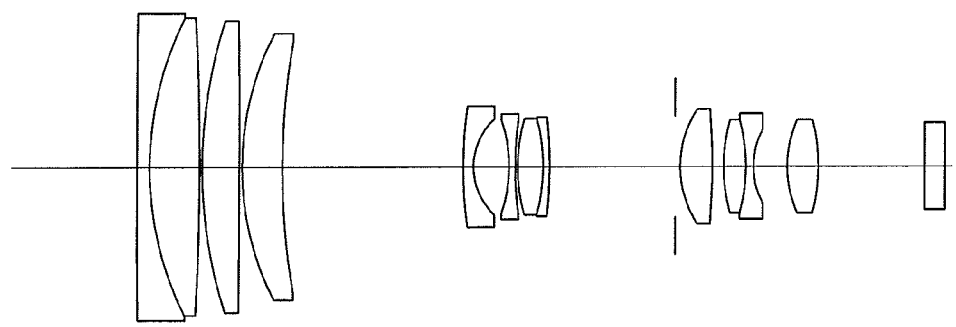
FIG. 13 shows a lens structure diagram at the intermediate focal length of Example 4.
Figure 14:
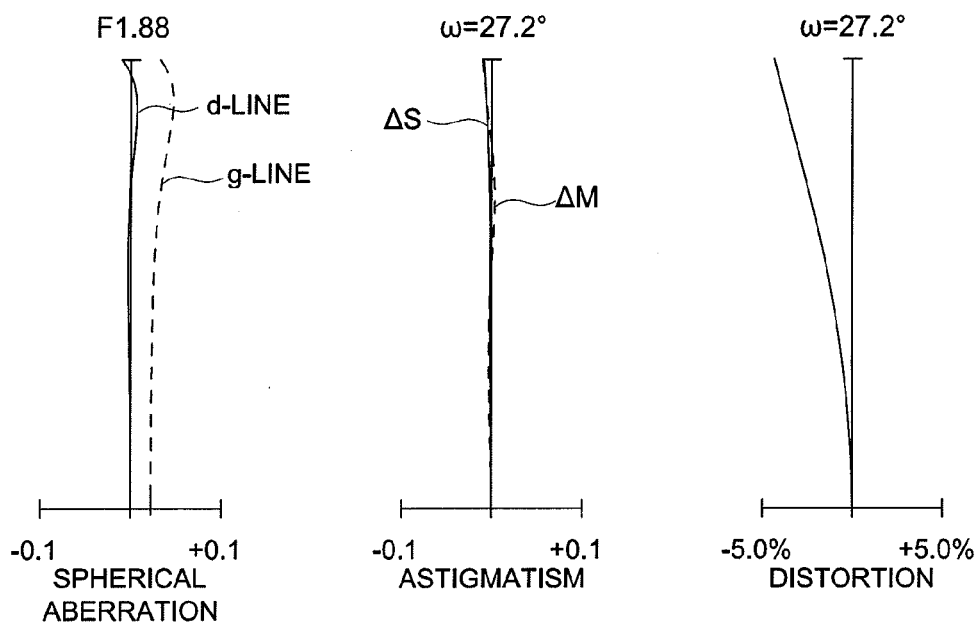
FIG. 14 shows aberration diagrams at the wide-angle end of Example 4.
Figure 15:
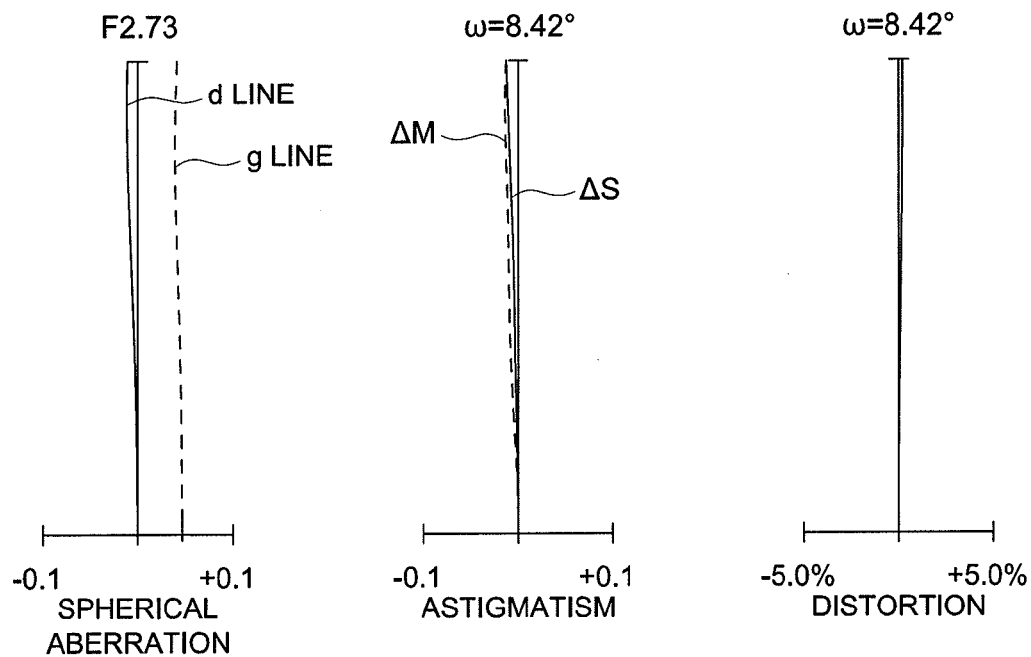
FIG. 15 shows aberration diagrams at the intermediate focal length of Example 4.
Figure 16:
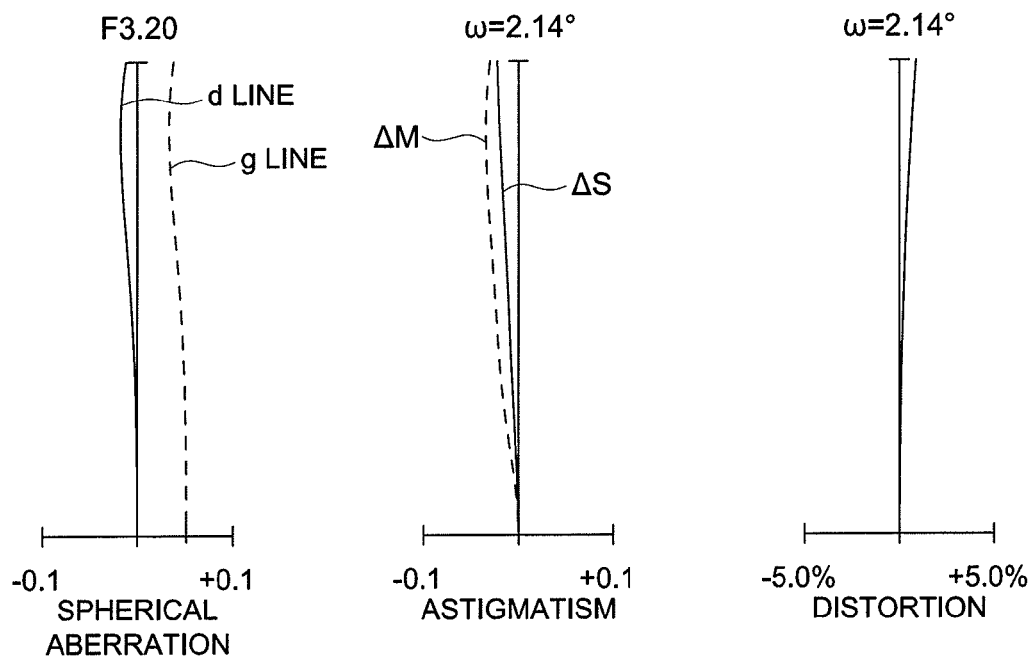
FIG. 16 shows aberration diagrams at the telephoto end of Example 4.

FIG. 13 shows a lens structure diagram at the intermediate focal length. FIG. 14 shows aberration diagrams at the wide-angle end. FIG. 15 shows aberration diagrams at the intermediate focal length. FIG. 16 shows aberration diagrams at the telephoto end.

The invention claimed is:

1. A zoom lens comprising, in order from an object side:
a first lens group with positive power;
a second lens group with negative power, moving for varying power of the zoom lens;
a third lens group with positive power, disposed statinarily; and
a fourth lens group with positive power, moving for correcting a position change of an image plane caused when the power of the zoom lens is varied,
wherein the first lens group comprises, in order from the object side, a negative eleventh lens, a positive twelfth lens and a positive thirteenth lens,
the second lens group consists of, in order from the object side, a negative twenty-first lens, a negative twenty-second lens, a positive twenty-third lens and a negative twenty-fourth lens,
the third lens group comprises, in order from the object side, a positive thirty-first lens, a positive thirty-second lens and a negative thirty-third lens,
the fourth lens group consists of a positive forty-first lens including one or more aspheric surfaces, and
the zoom lens satisfies the following conditional expressions:

$-1.8 < f2/fw < -0.9$, $2.9 < f34/fw < 3.5$, $75.0 < v1$, where f2 is a focal length of the second lens group,
f34 is a composite focal length of the third lens group and the fourth lens group at a wide-angle end,
fw is a focal length of the zoom lens at the wide-angle end, and
v1 is an Abbe number of at least one positive lens forming the first lens group.

2. The zoom lens of claim 1,
wherein the thirty-first lens includes at least one aspheric surface.

3. The zoom lens of claim 1
wherein the thirty-second lens and the thirty-third lens form a cemented lens made of glass, and
a cemented surface of the cemented lens is formed into a convex surface facing an image-plane side.

4. The zoom lens of claim 1
wherein a positive lens or positive lenses forming the third lens group satisfy the following expression:

$70.0 < v3$, wherein v3 is an Abbe number of at least one positive lens forming the third lens group.

5. The zoom lens of claim 1
wherein the third lens group consists of, in order from the object side, a positive thirty-first lens, a positive thirty-second lens and a negative thirty-third lens.

6. The zoom lens of claim 1
wherein the first lens group consists of, in order from the object side, a negative eleventh lens, a positive twelfth lens and a positive thirteenth lens.

7. The zoom lens of claim 1
wherein the twelfth lens satisfies the following expression:

$75.0 < v1$.

8. The zoom lens of claim 1
wherein the eleventh lens and the twelfth lens form a cemented lens made of glass.

9. The zoom lens of claim 1
wherein the first lens group satisfies the following expression:

$4.0 < f1/fw < 8.5$, where f1 is a focal length of the first lens group.

10. The zoom lens of claim 1
wherein each of one or more negative lenses included in the second lens group is a complex aspheric lens in which an aspheric surface made of resin is formed on a spherical glass surface.

11. The zoom lens of claim 1
wherein the forty-first lens satisfies the following expression:

$v41 > 60$, wherein v41 is an Abbe number of the forty-first lens.

12. The zoom lens of claim 1
wherein a focusing operation is performed from an object at an infinite distance to an object at a close distance by moving the fourth lens group in a direction of an optical axis.

13. The zoom lens of claim 1 further comprising a stop arranged at the object side of the third lens group,
wherein an opening diameter of the stop changes corresponding to a position of the second lens group on an optical axis.

* * * * *